United States Patent
Jia

(10) Patent No.: US 11,181,977 B2
(45) Date of Patent: Nov. 23, 2021

(54) SLIPPAGE COMPENSATION IN EYE TRACKING

(71) Applicant: Dolby Laboratories Licensing Corporation, San Francisco, CA (US)

(72) Inventor: Wenhui Jia, Dublin, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/193,913

(22) Filed: Nov. 16, 2018

(65) Prior Publication Data

US 2019/0155380 A1    May 23, 2019

Related U.S. Application Data

(60) Provisional application No. 62/588,247, filed on Nov. 17, 2017.

(51) Int. Cl.
| | |
|---|---|
| *G06F 3/01* | (2006.01) |
| *G06T 7/60* | (2017.01) |
| *G06T 7/73* | (2017.01) |
| *G06T 7/13* | (2017.01) |

(52) U.S. Cl.
CPC ............... *G06F 3/013* (2013.01); *G06T 7/13* (2017.01); *G06T 7/60* (2013.01); *G06T 7/73* (2017.01); *G06T 7/74* (2017.01); *G06T 2207/10048* (2013.01); *G06T 2207/30041* (2013.01); *G06T 2207/30196* (2013.01); *G06T 2207/30201* (2013.01); *G06T 2207/30204* (2013.01)

(58) Field of Classification Search
CPC .......... G06F 3/011; G06F 3/012; G06F 3/013; G06T 7/80; G06T 7/85; G06T 7/97; G06T 7/60; G06T 7/74; G06T 2207/30041
USPC .......................................................... 345/7–9
See application file for complete search history.

(56) References Cited

U.S. PATENT DOCUMENTS

| | | | | |
|---|---|---|---|---|
| 8,878,749 | B1 * | 11/2014 | Wu | G01S 17/06 345/8 |
| 8,929,589 | B2 | 1/2015 | Publicover | |
| 8,957,916 | B1 * | 2/2015 | Hedman | G02B 27/017 345/633 |
| 8,971,570 | B1 * | 3/2015 | Raffle | G06F 3/013 382/103 |
| 9,213,185 | B1 | 12/2015 | Starner | |
| 9,684,827 | B2 | 6/2017 | Zhang | |
| 2011/0213664 | A1 | 9/2011 | Osterhout | |
| 2013/0241805 | A1 * | 9/2013 | Gomez | G09G 3/003 345/8 |
| 2014/0218281 | A1 * | 8/2014 | Amayeh | A61B 3/14 345/156 |

(Continued)

OTHER PUBLICATIONS

Hong, Hua. et al., "Video-based eyetracking methods and algorithms in head-mounted displays", Optics Express, vol. 14, No. 10, May 15, 2006, Fig. 1-13, pp. 4332-4348.

(Continued)

*Primary Examiner* — Alexander Eisen
*Assistant Examiner* — Nelson Lam

(57) ABSTRACT

Methods for using a head mounted display (HMD) can detect slippage of the HMD through the use of a comparison between, for example, a calibrated glint reference point and a glint reference point calculated during monitoring of glints during usage of the HMD.

17 Claims, 7 Drawing Sheets

(56) References Cited

U.S. PATENT DOCUMENTS

| | | | |
|---|---|---|---|
| 2015/0098620 A1* | 4/2015 | Wu | G01S 17/06 |
| | | | 382/103 |
| 2016/0223819 A1 | 8/2016 | Liu | |
| 2016/0302663 A1* | 10/2016 | Fayolle | A61B 3/113 |
| 2016/0302665 A1 | 10/2016 | Swedish | |
| 2017/0124928 A1 | 5/2017 | Edwin | |
| 2017/0371407 A1* | 12/2017 | Vertegaal | G06F 3/013 |
| 2019/0250705 A1* | 8/2019 | Zhang | G02B 27/017 |
| 2019/0333109 A1* | 10/2019 | Teller | G06Q 30/0267 |
| 2020/0326777 A1* | 10/2020 | Shoushtari | G06T 19/006 |
| 2021/0181840 A1* | 6/2021 | Vlaskamp | G09G 5/38 |

OTHER PUBLICATIONS

Dong, H.Y. et al., "Non-intrusive eye gaze estimation without knowledge of eye pose", Sixth IEEE International Conference on Automatic Face and Gesture Recognition, 2004. Proceedings. Year: 2004, pp. 785-790.

Hansen, D.W. et al., "In the eye of the Beholder: A survey of Models for eyes and Gaze", IEEE Transactions on Pattern Analysis and Machine Intelligence, Year: 2010, vol. 32, Issue: 3, pp. 478-500.

Dong, H.Y., "Non-Contact eye gaze tracking system by mapping of cornea reflections", Automatic face and gesture recognition, 2002 proceedings. Fifth IEEE International Conference on IEEE, Piscataway, NJ, USA, pp. 101-106, XP010949343, ISBN: 978-0-7695-1602-8 *pp. 101-104, Figures 1-5.

* cited by examiner

GAZE MAPPING TABLE (CAN BE USED TO DERIVE MAPPING POLYNOMIAL)

| PUPIL POSITION | | GAZE POINT |
|---|---|---|
| $x_1, y_1$ | ↔ | $a_1, b_1$ |
| $x_2, y_2$ | ↔ | $a_2, b_2$ |
| $x_3, y_3$ | ↔ | $a_3, b_3$ |

SLIPPAGE COMPENSATION ALGORITHM EXAMPLE

OBTAINED IN CALIBRATION:

$C_{CAL}$ : REFERENCE CENTER OF GLINTS (IN IMAGE SENSOR SPACE)

MAP: MAPPING FROM EYE TO GAZE

---

TRACKING:
C: NEW GLINT CENTER DUE TO SLIPPAGE
P: PUPIL CENTER POSITION
S: GAZE POINT
$S = MAP(P - C) + a(C - C_{CAL})$

FIG. 5

SLIPPAGE COMPENSATION IN EYE TRACKING

CROSS-REFERENCE TO RELATED APPLICATION(S

This application claims the benefit of priority to U.S. Provisional Patent Application No. 62/588,247 filed Nov. 17, 2017, which is incorporated herein by reference in its entirety.

BACKGROUND

Eye tracking is often used in head mounted displays, particularly head mounted displays that are used in virtual reality applications or augmented reality applications. In a head mounted display which includes eye tracking, a camera is mounted inside the headset of the head mounted display to capture images of an eye, and a data processing system within the head mounted display or coupled to the head mounted display can process the captured images in order to detect pupil movement. For two dimensional video-based eye trackers, the pupil center is first detected within each image. Through calibration, a mapping between the pupil position in the eye image to a gaze point on the display panel can be established. If the head and eyes stay at the calibration position, the calibrated mapping will still remain valid and will provide accurate eye tracking performance. However, slippage can happen because of the weight of the head mounted display or user head movement or facial expressions. While eye tracking systems that use three-dimensional models of the eye can compensate for slippage, there is no known solution for slippage compensation in two dimensional video-based eye tracking. Gaze tracking is described in the following prior art literature: U.S. Pat. Nos. 8,929,589; 9,684,827; US Patent Application Publication US2016/0223819; US Patent Application Publication US2017/0124928; and an article by Dan Witzner Hansen, et al., "In The Eye Of The Beholder: A Survey Of Models For Eyes And Gaze", IEEE Transactions On Pattern Analysis And Machine Intelligence, Volume 32, Number 3, pages 478-500, March, 2010.

SUMMARY OF THE DESCRIPTION

The embodiments described herein relate to the use of a head mounted display or other display device which can experience slippage. In one embodiment, a method for using a head mounted display can include the following operations: determining a first set of one or more glint reference points derived from one or more glints that were imaged during a calibration of a glint system in a head mounted display (HMD); monitoring glints during usage of the head mounted display after the calibration of the glint system; determining, in response to the monitoring of glints, a second set of one or more glint reference points derived from one or more glints that were imaged during the monitoring; detecting slippage of the head mounted display in response to detecting a difference between the first set of one or more glint reference points and the second set of one or more glint reference points. In one embodiment, this method is performed without a three-dimensional model of the user's eye or eyes and is performed in a two dimensional video-based eye tracker located in the head mounted display. In one embodiment, the first set of one or more glint reference points is a single glint reference point which is an intersection of a first and second diagonal in a first quadrilateral; each of the diagonals can intersect two opposing vertices of a first quadrilateral derived from four glints that were imaged during the calibration. The second set of one or more glint reference points can be a single glint reference point which is also an intersection of two diagonals, such as a third and fourth diagonal, each of which intersect two opposing vertices of a second quadrilateral derived from four glints that were imaged during the monitoring.

In one embodiment, the monitoring detects the second quadrilateral and in response to detecting the second quadrilateral, the second set of one or more glint reference points are determined. In one embodiment, the monitoring detects when the viewer is looking straight ahead and can determine when to calculate the second set of one or more glint reference points based upon determining that the viewer is looking straight ahead. In one embodiment, the determination of the first set of one or more glint reference points can include requesting a viewer using the head mounted display to look straight ahead and determining a quadrilateral having vertices defined by four glints that were imaged during the calibration. In one embodiment, the glint system can include four infrared light sources that create the four glints and can also include an image sensor that can capture infrared light and that can capture images of the four glints.

In one embodiment, the detection of quadrilaterals can be performed by a process which includes fitting an ellipse to a detected pupil in an image and determining a center and size of the fitted ellipse. A circle can be rendered with the center of the circle at the ellipse's center, and the circle can have a radius that is at least twice (in one embodiment) the average of a major and minor radius of the ellipse. Contours defined by the glints in the image can be identified within the circle, and if the number of contours is four, the coordinates of the four glints can be obtained to derive the four vertices of a quadrilateral.

In one embodiment, the difference between the first set of one or more glint reference points and the second set of one or more glint reference points is compared to a threshold to determine whether to compensate for slippage. A method according to one embodiment can further include compensating for the detected slippage, the compensating based on an offset between the first set of one or more glint reference points and the second set of one or more glint reference points. The compensating can also be based on a gaze mapping which uses as an input a vector from the second set of one or more glint reference points to a pupil center of an imaged pupil. In one embodiment, the method can also include calibrating the gaze mapping by requesting a viewer to look at one or more objects on the display of the head mounted display and recording the position of a pupil center on an image sensor when the viewer looks at each of the one or more objects. The method according to one embodiment can further include detecting a pupil center during the usage of the head mounted display and determining a gaze of the viewer based on the detected pupil center.

Another aspect of this disclosure relates to determining when to attempt to detect slippage and compensate for slippage. A method according to one embodiment for using a head mounted display can include the following operations: determining a first set of one or more glint reference points derived from one or more glints that were imaged while a viewer gazed in a predetermined direction during calibration of a head mounted display; monitoring glints during usage of the head mounted display after calibration of the glint system; determining, during the usage of the head mounted display, the viewer is gazing in the predetermined direction and in response determining whether to compensate for slippage. In this embodiment, detecting gazing in the predetermined direction can be used to determine whether to attempt to detect slippage which in turn can be used to determine whether or not to compensate for slippage. In one embodiment, the predetermined position occurs when the user is looking straight ahead. In one embodiment, the viewer is determined to be gazing in the predetermined direction by detecting the same glint pattern that was detected during calibration.

The methods and systems described herein can be implemented by head mounted displays and by data processing systems embedded within a head mounted display or coupled to the head mounted display. The methods and systems described herein can also be implemented by one or more data processing systems which execute executable computer program instructions, stored in one or more non-transitory machine readable media or medium that cause the one or more data processing systems to perform the one or more methods described herein when the program instructions are executed. Thus the embodiments described herein can include methods, data processing systems, head mounted displays, and non-transitory machine readable media such as DRAM memory and flash memory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 4 shows an example of a gaze mapping table which can be created as a result of a calibration operation.

FIG. 5 shows an example of a slippage compensation algorithm which can be used according to one embodiment described herein.

DESCRIPTION OF EXAMPLE EMBODIMENTS

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
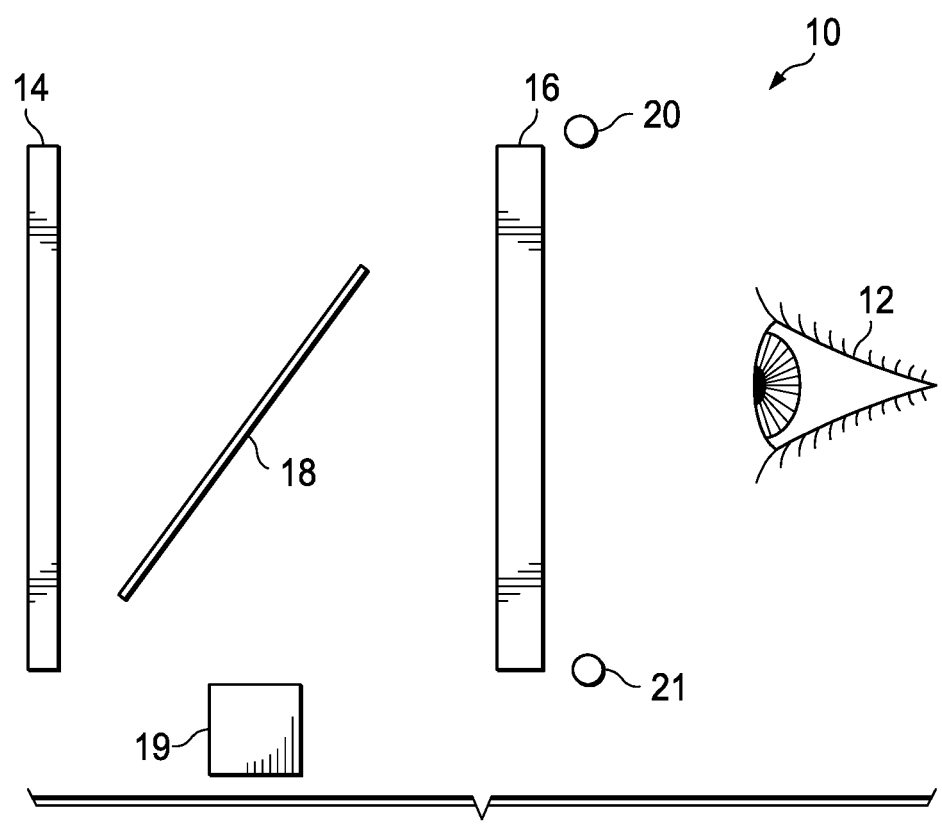
FIG. 1 shows, in a side view, an example of a head mounted display in one embodiment.
Figure 9A:
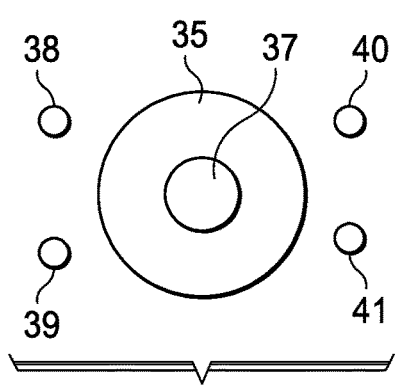
FIG. 9A shows an example of four glints around the iris and pupil of an eye.
Figure 9B:
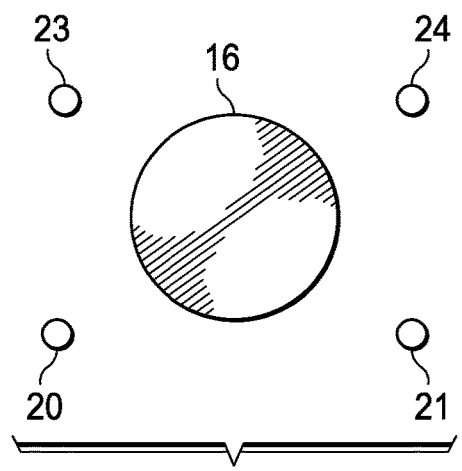
FIG. 9B shows an example placement of four infrared light sources around one HMD lens.

Eye tracking while a viewer watches images on a display can enhance virtual reality and augmented reality applications, and the eye tracking can be performed in a head mounted display such as the head mounted display 10 shown in FIG. 1. The head mounted display 10 can include a display panel 14 which can be viewed through lens 16 and beam splitter 18 by one or more eyes of the user of the head mounted display 10. In the example shown in FIG. 1, a user's eye 12 views images on display panel 14 by looking through the lens 16 and the beam splitter 18 to see the image on the display panel 14. An eye tracking method can use an image sensor 19 which can capture images of the viewer's eye while watching the images on the display panel 14. In one embodiment, the image sensor 19 can be an infrared capable image sensor that can capture images in infrared light, and the infrared light can be generated by one or more light sources, such as light sources 20 and 21 shown in FIG. 1. In one embodiment, there can be four light sources, such as the four light sources 20, 21, 23, and 24 shown in FIG. 9B which will be described further below. In one embodiment, each of the light sources, such as light sources 20 and 21 can be an infrared light emitting diode (LED) which generates infrared light that is directed towards the user's eye, such as the eye 12 to generate infrared light that illuminates the surface of the user's eye 12. In one embodiment, these light sources, such as light sources 20, 21, 23 and 24 can create reflections or glints on the surface of the user's eye, such as the eye 12 shown in FIG. 1. In one embodiment, these light sources can be positioned between the eye 12 and the lens 16; two such light sources 20 and 21 are shown near the peripheral edge of lens 16 in FIG. 1 between the eye 12 and the lens 16. In one embodiment, the light sources can be placed surrounding the lens 16 so that the glints (e.g., four glints as shown in FIG. 9A) surround the pupil when the eye is looking straight through the lens 16. These glints can be used as described below to detect slippage and can be used to determine the amount of slippage and to compensate for the amount of slippage which was determined as described herein.

Referring to FIG. 1, an image sensor 19 can include a lens which receives reflections from the surface of the eye and allows those reflections to be focused upon an image sensor, such as the image sensor 19. In one embodiment, the lens can be above the image sensor 19 shown in FIG. 1 so that it can receive and focus reflections such as glints off the surface of the eye which result from the reflections created by the light sources 20, 21, 23, and 24. In the example shown in FIG. 9B, a set of four light sources can create four glints, such as the glints 38, 39, 40, and 41 shown in FIG. 9A which surround the iris 35 and the pupil 37 as shown in FIG. 9A. The image sensor 19 and the light sources, such as light sources 20, 21, 23, and 24 can operate continuously to capture images of the glints and thereby provide a two dimensional video based eye tracker in one embodiment. In addition, the image sensor 19 can also capture images of the iris 35 and the pupil 37 in order to determine the user's gaze. In one embodiment, the system can be calibrated by asking the user to look at different objects at different times on the display panel, such as display panel 14 and the system observes the location of the pupil's center at those different times and records the association between the coordinates of the pupil center on the image sensor in the image sensor's coordinate space relative to coordinates on the display panel 14 that the user was looking at, with the coordinates on the display panel being in the display panel's coordinate space. FIG. 4 shows an example of a gaze mapping table which will be described further below.

Figure 2A:
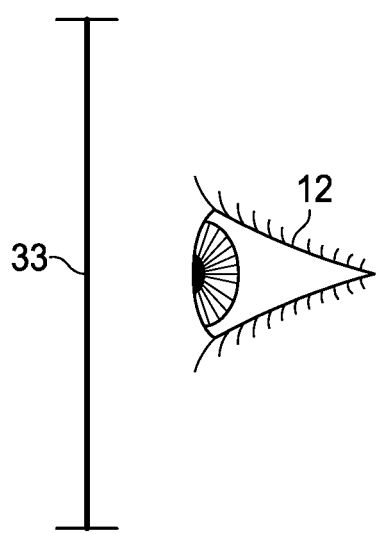
FIG. 2A shows a head mounted display relative to an eye of the user before slippage occurs.
Figure 2B:
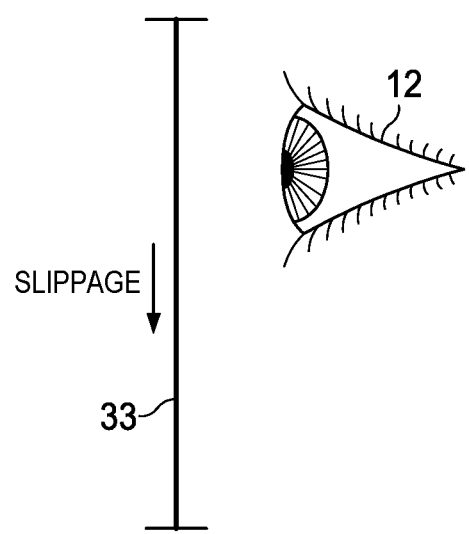
FIG. 2B shows the head mounted display of FIG. 2A after slippage occurs.

As will be described below, the glints captured by an imaging system can be used to detect slippage, such as the slippage shown in FIGS. 2A and 2B. The head mounted display 33, shown in a side view, can be seen substantially centered relative to the user's eye 12. After slippage, the head mounted display 33 slips downwardly relative to the user's eye 12 as shown in FIG. 2B. This slippage can cause errors in eye tracking, and the methods described herein can be used to detect the slippage and to determine compensation for the detected slippage.

Figure 3A:
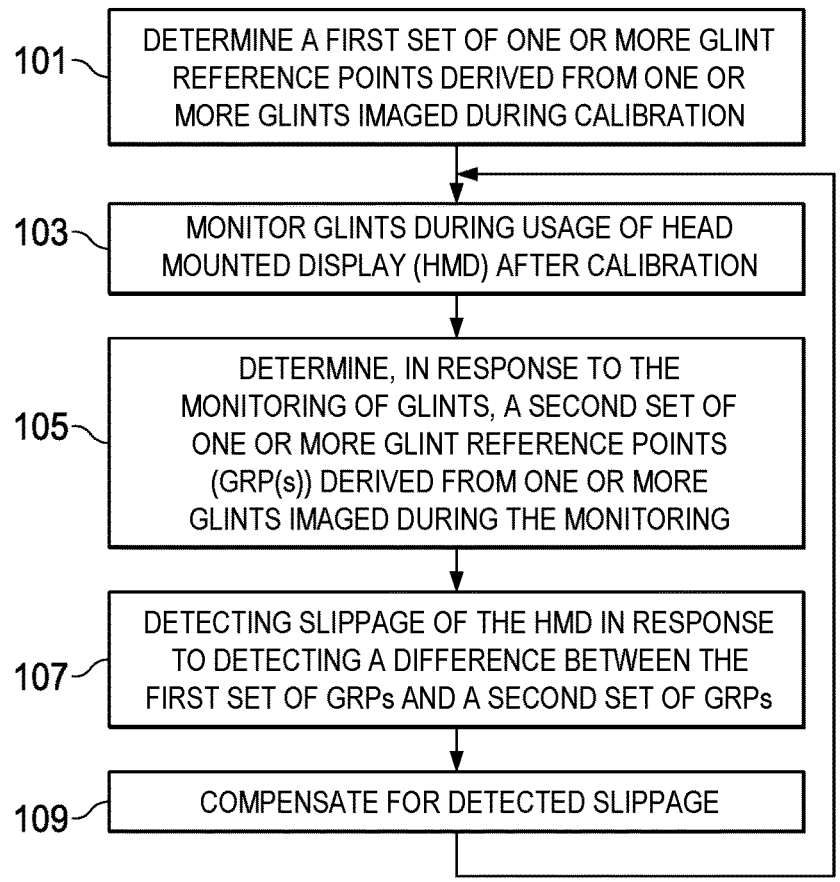
FIG. 3A is a flowchart which illustrates a method according to one embodiment of the invention.

FIG. 3A shows a method according to one embodiment which can generate one or more glint reference points that can be used to detect slippage of a head mounted display. The method can begin in operation 101, and operation 101 can include determining a first set of one or more glint reference points which can be derived from one or more glints that are imaged during calibration. For example, in one embodiment, the user can be asked to look straight ahead at a centered target on the display panel while light sources, such as light sources 20, 21, 23, and 24 shown in FIG. 9B generate four glints, such as glints 38, 39, 40, and 41 shown in 9A. Those four glints can be used to derive one or more glint reference points, such as a single glint reference point derived from an intersection of two diagonals in a quadrilateral derived from four glints, where the four glints represent the four vertices of the quadrilateral. In another embodiment, more than four glints may be imaged or less than four glints may be imaged in order to create one or more glint reference points.

Figure 7:
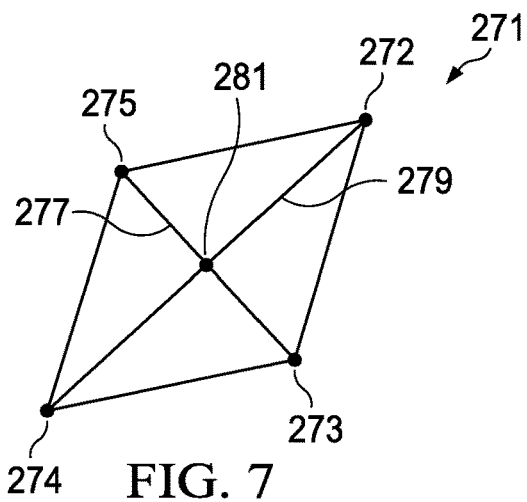
FIG. 7 shows how the intersection of two diagonals within a quadrilateral can be used to generate a glint reference point according to one embodiment described herein.

FIG. 7 shows an example of the glint reference point 281 at the intersection of the two diagonals 277 and 279 within the quadrilateral 271. The quadrilateral has four vertices 272, 273, 274, and 275, with each of the vertices being defined by one of the four glints in an embodiment which uses four light sources such as the four light sources shown in FIG. 9B. Thus operation 101 can be performed during calibration and can be used to determine a single glint reference point, such as the glint reference point 281 which can thereafter be used to detect slippage. After calibration, operation 103 can be performed in the method shown in FIG. 3A. In operation 103, the glints are monitored during usage of the head mounted display after calibration. In one embodiment, this can involve continuously capturing images of the eye by the image sensor 19 and the eye can be illuminated by the four light sources 20, 21, 23, and 24. These images captured during the monitoring operation 103 can be used in operation 105 to determine a second set of one or more glint reference points derived from the one or more glints imaged during the monitoring. For example, during the monitoring, four glints may appear around the iris, such as the iris 35 and these glints can be used to determine a second set of one or more glint reference points. For example, in an embodiment which uses four light sources and which attempts to detect those four light sources and derive a quadrilateral, such as the quadrilateral 271 shown in FIG. 7, the system can derive a second glint reference point which can be the intersection of two diagonals within a quadrilateral detected during the monitoring operation. The second set of one or more glint reference points can then be compared in operation 107 which can detect slippage of the head mounted display by detecting a difference between the first set of glint reference points and the second set of glint reference points. For example, the first glint reference point can be the intersection of two diagonals in a first quadrilateral, and the coordinates, in the image sensor coordinate space, can be compared to coordinates of a second glint reference point derived from the intersection of two diagonals in a second quadrilateral that was derived from four glints imaged during the monitoring.

A difference between the first and the second glint reference points can indicate that slippage has occurred. In one embodiment, the difference can be compared to a threshold so that small differences between the glint reference points can be ignored while a difference is larger than the threshold can be treated as a slippage and hence slippage compensation can then be performed. Slippage compensation, referring back to FIG. 3A, can be performed in operation 109 and further details about one embodiment of slippage compensation are provided further below. After operation 109, the method can return back to operation 103 and can continue repeatedly over time as the user uses the head mounted display. The method shown in FIG. 3A can be used in conjunction with methods for capturing images of the user's pupil and using those captured images to determine the gaze of the user while watching images on a display panel, such as the display panel 14. For example, a mapping from the pupil position to the gaze point can be used to determine the user's gaze while watching one or more images on the display of a head mounted display such as the display panel 14.

Figure 3B:
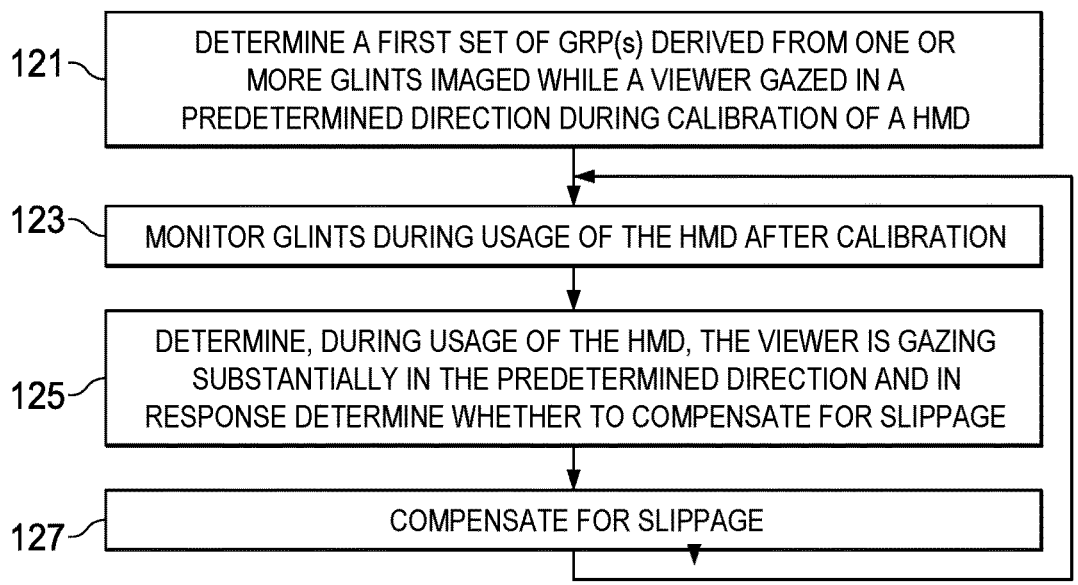
FIG. 3B is a flowchart which shows a method according to one embodiment of the invention.

FIG. 3B shows another aspect of certain embodiments herein in which the system checks for slippage at certain points during usage of the head mounted display such as when the system detects that the user is looking in a predetermined direction or when the system detects when a certain number of glints are detected, such as four glints. In one embodiment, the system does not attempt to detect slippage when less than four glints are detected. The method shown in FIG. 3B can begin in operation 121 and can include a determination of a first set of glint reference points which are derived from one or more glints imaged while a viewer gazed in a predetermined direction during calibration of the head mounted display. In one embodiment, the predetermined direction can be when the user is looking straight ahead, and the user can be asked to look at a target or object which is centered on the display panel to cause the user to look straight ahead (or the user can be asked to look straight ahead). In one embodiment, the user may be told to adjust the head mounted display so that the target is centered in the viewing field while the user is looking straight ahead. In one embodiment, the set of glint reference points can be a single glint reference point represented by the intersection of two diagonals in a quadrilateral having four vertices defined by the four glints that appear in an image captured during calibration. Thus, the glint reference point 281 at the intersection of the two diagonals 277 and 279 can be the first glint reference point determined in operation 121 during the calibration operation. That first glint reference point will be compared to subsequent glint reference points during the monitoring in one embodiment, such as the method shown in FIG. 3A. In operation 123 of FIG. 3B, system monitors glints during usage of the head mounted display after the calibration operation. While monitoring these glints, the system can determine, in operation 125 that the viewer is gazing substantially in the predetermined direction and in response can determine whether to compensate for slippage. In one embodiment, the system can determine the user is gazing substantially in the predetermined direction by determining that the four glints captured in an image during calibration reappear during the monitoring. In one embodiment, the system can decide that the user is gazing in substantially the predetermined direction whenever the four glints reappear during the monitoring. In one embodiment, the system will not attempt to detect slippage when less than four glints appear. If operation 125 in FIG. 3B detects the viewer is gazing in substantially the predetermined direction then, the system determine whether or not slippage has occurred and can then compensate for slippage in operation 127 shown in FIG. 3B. Processing can then revert back to operation 123, and operations 123, 125, and 127 can continue in a continuous loop during the use of the head mounted display in one embodiment. The method shown in FIG. 3B can limit how often the system checks for slippage by only doing so when a predetermined pattern of glint reflections is observed or captured during usage of the head mounted display.

Figure 3C:
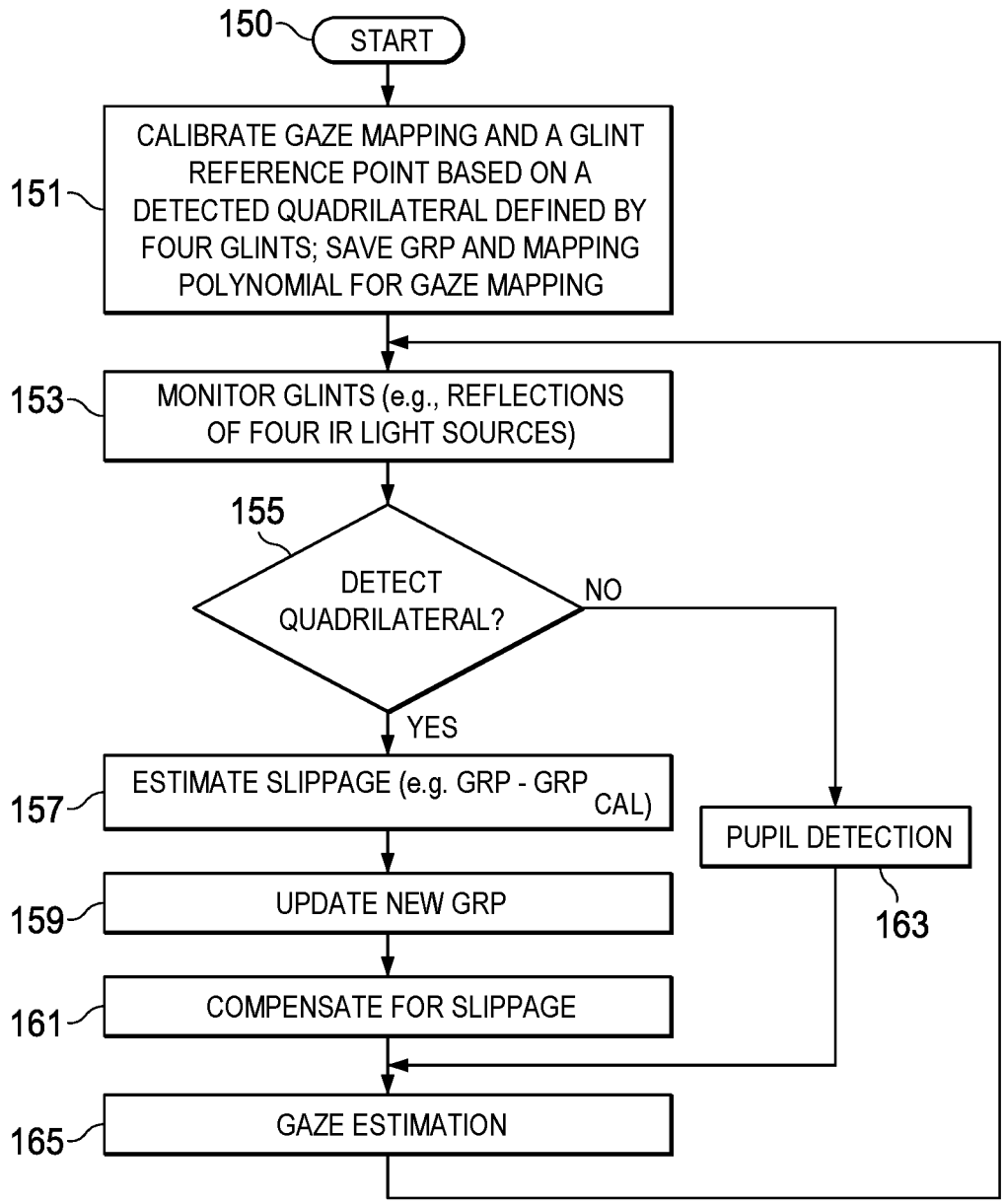
FIG. 3C is a flowchart which shows a method according to an embodiment of the invention.

FIG. 3C shows an example of a method according to one embodiment. The embodiment represented by FIG. 3C can use four infrared light sources which can be arranged as vertices of a rectangle, such as the four light sources 20, 21, 23, and 24 shown in FIG. 9B. The method shown in FIG. 3C can start 150 in operation 151 which involves one or more calibration operations in order to calibrate for both gaze mapping and eye tracking. In particular, in operation 151, gaze mapping can be calibrated to create a gaze mapping table, such as the gaze mapping table shown in FIG. 4, and the gaze mapping table can then be used to derive a polynomial mapping function as is known in the art to translate from a detected pupil position in the image sensor's coordinate space to a gaze point in the display panel's coordinate space. In one embodiment, the calibration of gaze mapping can involve displaying a set of reference objects on the display panel at different locations on the display panel and asking to user to look at each one in series over time. For example, the display panel can show a point or object in the upper left corner of the display panel and ask the user to look at that point, and then ask the user to look at a point displayed in the upper right corner of the display panel, and then ask the user to look at a point at the center of the display panel, and then ask the user to look at a point in the lower left of the display panel, and finally ask the user to look at a point displayed on the lower right of the display panel. Each time the user looks at one of the points, the image sensor can capture the pupil position in the coordinate space of the image sensor which can then be mapped to or associated with the known gaze point which is the position of the point on the display panel. In one embodiment, this process of calibrating the gaze mapping can be performed once and reused even when the head mounted display is removed from the viewer's head and placed back on the viewer's head.

In one embodiment, operation 151 can also include calibrating the glint system to derive a glint reference point which can be based upon a detected quadrilateral that is defined by four glints. FIG. 9A shows an example of four glints 38, 39, 40, and 41 that are reflected off the user's eye when the user is requested to look straight ahead in one embodiment. The glint system can capture on the image system, such as the image sensor 19 the four glints and record their location in the image sensor's coordinate space. A processing system within the head mounted display or coupled to the head mounted display can then derive a quadrilateral defined by the four glints and can then calculate the two diagonals defined by the opposing vertices of the quadrilateral to derive the intersection of those diagonals which in one embodiment can be the glint reference point. FIG. 5 shows an example of a glint reference point which can be the intersection of the two diagonals defined by the quadrilateral; in the case of FIG. 5 the original glint reference point derived from the calibration operation 151 can be referred to as $C_{cal}$ and can be referred to as the reference center of the glints in the image sensor's coordinate space. The result of operation 151 can include both a mapping polynomial for gaze mapping derived from a gaze mapping table such as the gaze mapping table shown in FIG. 4 and a glint reference point such as a reference center of the glints shown in FIG. 5.

Operation 153 shown in FIG. 3C can be performed after the calibration operations in operation 151. Operation 153 can be performed during normal use of the head mounted display by a user. For example, operation 153 can occur while the user is watching a virtual reality application or an augmented reality application by using the head mounted display. The application, such as a virtual reality application, can display images within the head mounted display which can then track the eye of the user to determine gaze directions of the user as the user watches the images presented by the application. During operation 153, one or more image sensors of the head mounted display can monitor the glints created by light sources, such as the light sources 20, 21, 23, and 24 in one embodiment. For example, operation 153 can involve monitoring the reflections of four infrared LED light sources which generate one or more glints. In one embodiment, the four infrared light sources can be outside of the normal viewing abilities of a display. The monitoring in operation 153 can in one embodiment employ the method shown in FIG. 6A for detecting a quadrilateral while monitoring the glints. Many positions of the eye may not produce four glints and hence a quadrilateral may not be detected; other positions of the eye, such as looking straight ahead often can produce four glints which can result in the detection of a quadrilateral. When the method shown in FIG. 3C detects a quadrilateral during the monitoring, processing can proceed from operations 153 and 155 to operation 157 in which the system determines whether there is slippage by comparing a new glint reference point (also referred to as a new glint center in FIG. 5) to the glint reference point derived from the calibration operation in operation 151 (also referred to as the reference center of glints in FIG. 5).

In one embodiment, the difference between the two glint reference points can be calculated and compared to a threshold to determine whether the slippage is sufficient enough that it requires compensation. If the difference is below the threshold in one embodiment, no compensation is performed for the slippage. The new glint center or new glint reference point can be derived from the intersection of the two diagonals in the quadrilateral detected in operation 155. If operation 157 determines that there has been slippage, then the system in operation 159 can update the glint reference point to be the new glint reference point (or new glint center) as shown in FIG. 5. Then in operation 161, the system can perform a compensation for slippage, and FIG. 5 shows an example of a slippage compensation algorithm which can be used to compensate for slippage.

Figure 8:
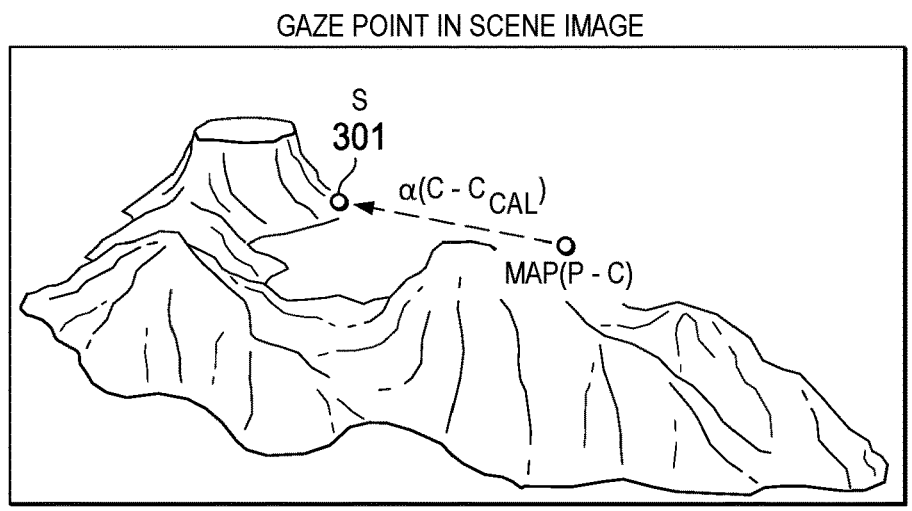
FIG. 8 shows an example of the mapping after slippage compensation of a gaze point according to one embodiment described herein.

As shown in FIG. 5, the slippage compensation algorithm can use the mapping from pupil position to gaze position and can use the reference center of glints which can be the glint reference point derived in operation 151 in FIG. 3C. These values can be obtained in calibration and then used in tracking which can occur in operation 153 (in FIG. 3C) in which the glints are monitored. During tracking, when a quadrilateral is detected in operation 155 (in FIG. 3C), the system can calculate a new glint reference point which may be the same as the glint reference point if there is no slippage. The difference between the glint centers, such as the new glint center (C) and the reference center of glints ($C_{cal}$) can be used to determine whether there is slippage and the compensation can be calculated as shown in the formula in FIG. 5 for the gaze point. In one embodiment, the gaze point can be calculated as: $S = \text{Map}(P-C) + \alpha(C-C_{cal})$. Map represents the mapping from the eye position to the gaze position, and P represents the pupil center position, and C represents the new glint center (also referred to as glint reference point) computed, for example, from the intersection of two diagonals in the quadrilateral detected during the monitoring (e.g., during operation 153 in FIG. 3C). FIG. 8 shows an example in a scene image of the compensation due to slippage in one embodiment, where the gaze point 301 is calculated based upon the formula shown in FIG. 5 and takes into account or compensates for slippage of the head mounted display. The scalar value alpha ($\alpha$) translates the eye offset to the scene offset and can be computed from specifications of the lens (e.g., lens 16) or can be measured experimentally. In one embodiment, the pupil position can be represented (as is known in the art used for video based eye tracking) by a vector from the new glint reference point to the detected pupil center.

Referring back to FIG. 3C, after operation 161 computes the compensation for slippage, that information is provided to the system for the purposes of gaze estimation in operation 165. Operation 165 can use the algorithm shown in FIG. 5 to compute the gaze point which is compensated for slippage in one embodiment by using the algorithm shown in FIG. 5. Following operation 165, processing can revert back to operation 153 and the cycle can be repeated as a loop through the operations shown in FIG. 3C. When no quadrilateral is detected in operation 155, processing can proceed to pupil detection in operation 163 which in turn can be used to estimate the gaze of the viewer in operation 165. In one embodiment, the detection of the quadrilateral in operation 155 is similar to operation 125 in FIG. 3B in that it determines when to check for slippage in one embodiment.

Figure 6A:
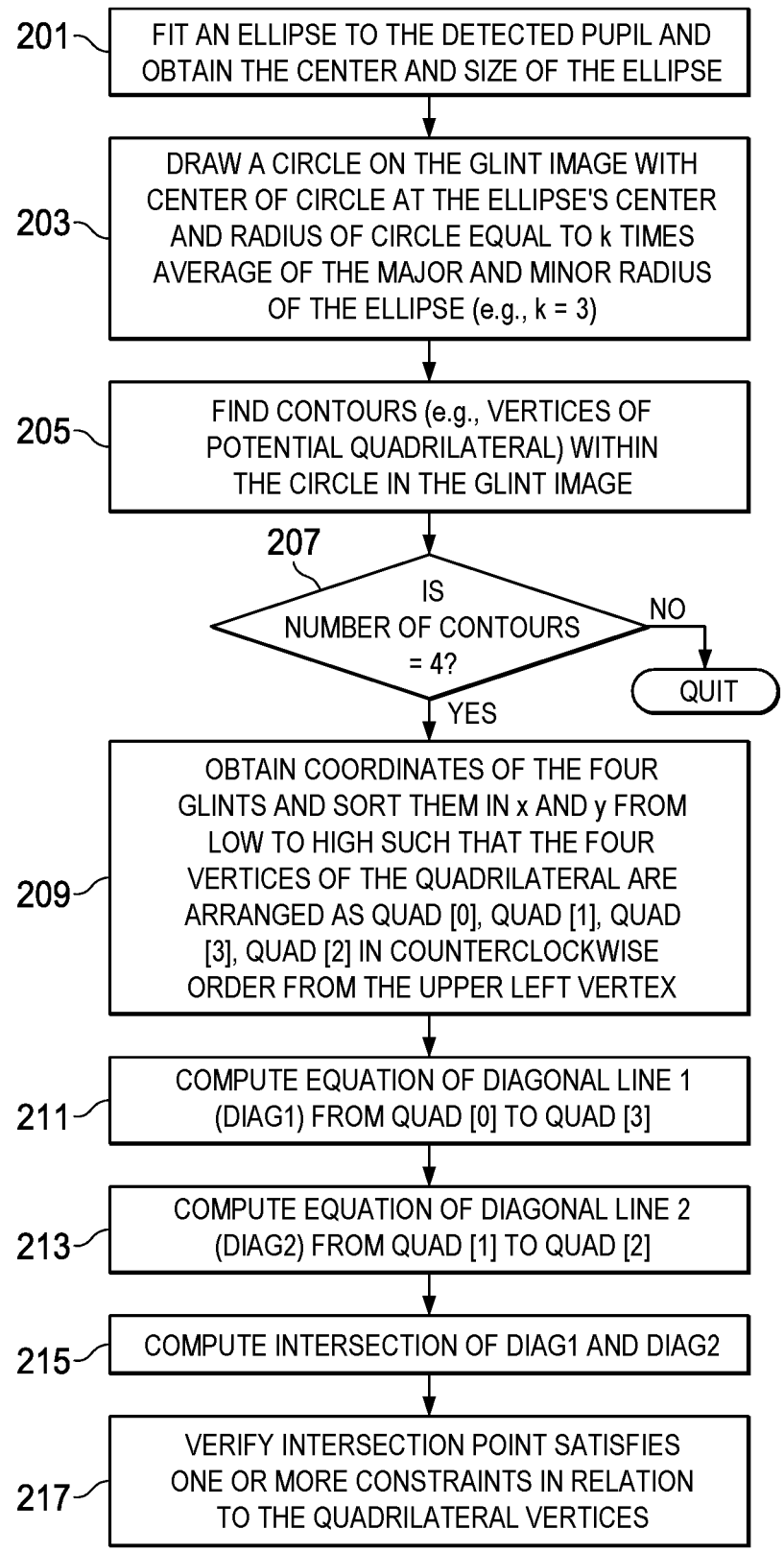
FIG. 6A is a flowchart which shows a method for detecting a quadrilateral from the reflections of light sources in the head mounted display, such as the infrared LED light sources in one embodiment which generate the glints.
Figure 6B:
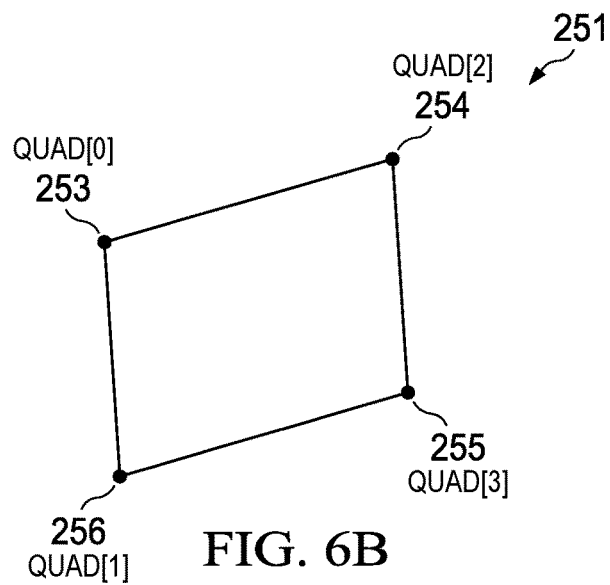
FIG. 6B shows an example of a quadrilateral which can be detected using the method shown in FIG. 6A.

FIG. 6A shows an example of a method that can be used to detect a quadrilateral from reflections or glints off the surface of the user's eye. In one embodiment, the method shown in FIG. 6A can provide a robust algorithm to reliably detect a true quadrilateral formed by the reflections. The method of FIG. 6A can begin in operation 201 in which an ellipse is fitted to the detected pupil which has been captured by an image sensor, such as the image sensor 19 shown in FIG. 1. The method can obtain the center and size of the ellipse that is fitted to the detected pupil. Then, in operation 203, a circle can be drawn on the glint image with the center of the circle at the ellipse's center which was fitted in operation 201. In one embodiment, the radius of the circle which is drawn in operation 203 can be set equal to a constant value (e.g., K) multiplied by the average of the major and minor radius of the ellipse. In one embodiment, the constant can be of value such as three, etc. and the constant can be any value in a range from 2 to 5 in one embodiment. The size of the circle can be drawn in such a manner that it will be sufficiently large to capture glints that surrounds the iris, such as the iris 35 shown in FIG. 9A. Then in operation 205 the system determines or finds contours which can be the vertices of a potential quadrilateral within the circle in the glint image. In operation 207, the system can then determine whether the number of contours is equal to four. If the number is not equal to four, then the method of FIG. 6A stops or quits and the system determines that no quadrilateral has been detected (which, in the case of the method shown in FIG. 3C, means processing proceeds from operation 155 to operation 163 because no quadrilateral was detected). If the number of contours does equal four, then operation 207 causes the system to proceed to operation 209 for further evaluation of whether a quadrilateral exists. In operation 209, the system obtains coordinates of the four glints and sorts them in X and Y from low to high such that the four vertices of the potential quadrilateral are arranged in the manner shown in FIG. 6B with the labels shown in FIG. 6B such as Quad [0], etc. In the example shown in FIG. 6B, the quadrilateral 251 includes vertices 253, 254, 255, and 256 with their associated labels as shown in FIG. 6B. After operation 209 has been performed, in operation 211, the system can compute the equation of a diagonal line 1 between two opposing vertices (e.g., vertices 253 and 255) and in operation 213 can compute the equation of a second diagonal line referred to as diagonal line 2 from the two other opposing vertices (e.g., vertices 256 and 254). FIG. 7 shows an example of two diagonals, each between opposing vertices of the quadrilateral 271. Referring back to FIG. 6A, in operation 215 the system can then compute the intersection of the two diagonals to derive the intersection point which can be treated as a glint reference point during calibration or as a new glint center during tracking. Operation 217 can be performed to ensure that the intersection point is a valid point in that a true quadrilateral has been detected. In one embodiment, operation 217 can be performed by verifying that the intersection point satisfies one or more constraints in relation to the quadrilateral vertices. For example, one constraint can require that the intersection point should be inside the diagonal line 1 and has a distance away from both ends of the diagonal line 1. Similarly, a further constraint can include requiring that the intersection point should be inside the diagonal line 2 and has a distance away from both ends of the diagonal line 2. If the intersection point satisfies both constraints in one embodiment, then the intersection point that is obtained can be considered to qualify as a quadrilateral center and therefore qualify as a glint reference point in the calibration operation or as a valid new glint center during the eye tracking operation, such as the monitoring operation of operation 153 shown in FIG. 3C.

Figure 10:
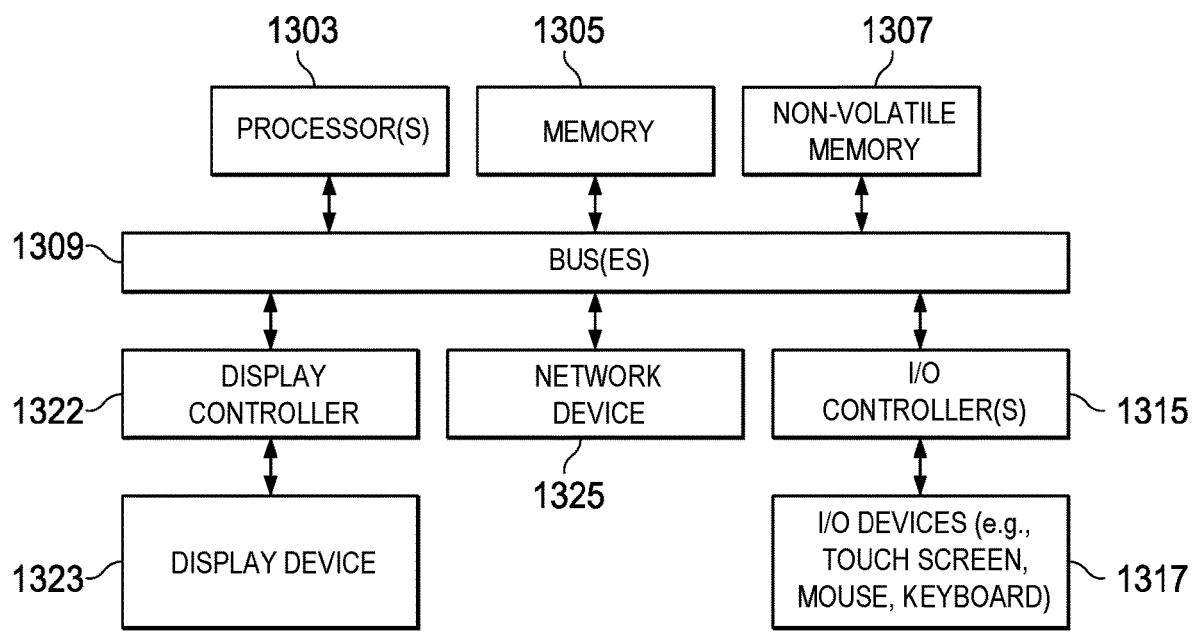
FIG. 10 shows an example of a data processing system which can be used in conjunction with the methods described herein and which can be part of or coupled to a head mounted display according to one embodiment described herein.

FIG. 10 shows an example of a data processing system that can be used by or in a head mounted display to provide one or more embodiments described herein. The systems and methods described herein can be implemented in a variety of different data processing systems and devices, including general-purpose computer systems, special purpose computer systems, or a hybrid of general purpose and special purpose computer systems. Data processing systems that can use any one of the methods described herein include a head mounted display, portable processing systems such as smart phones, tablet computers, embedded electronic devices, or other electronic devices.

FIG. 10 is a block diagram of data processing system hardware according to an embodiment. Note that while FIG. 10 illustrates the various components of a data processing system, it is not intended to represent any particular architecture or manner of interconnecting the components as such details are not germane to the present invention. It will also be appreciated that other types of data processing systems that have fewer components than shown or more components than shown in FIG. 10 can also be used with one or more embodiments of the present invention.

As shown in FIG. 10, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a display device 1323. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The input/output devices 1317 are coupled through one or more I/O controllers 1315 as is known in the art.

While FIG. 10 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WiFi, Bluetooth) that receive images from a camera, etc.

It will be apparent from this description that one or more embodiments of the present invention may be embodied, at least in part, in software. That is, the techniques may be carried out in a data processing system in response to its one or more processors executing a sequence of instructions contained in a storage medium, such as a non-transitory machine-readable storage medium (e.g. DRAM or flash memory). In various embodiments, hardwired circuitry may be used in combination with software instructions to implement the present invention. Thus the techniques are not limited to any specific combination of hardware circuitry and software, or to any particular source for the instructions executed by the data processing system.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A method for using a head mounted display (HMD), the method comprising:
   determining a first set of one or more first glint reference points derived from one or more glints that were imaged during a calibration of a glint system in the HMD;
   monitoring glints during usage of the HMD after the calibration of the glint system;
   determining, in response to the monitoring of the glints, a second set of one or more second glint reference points derived from one or more glints that were imaged during the monitoring;
   detecting slippage of the HMD in response to detecting a difference between the first set of the one or more first glint reference points and the second set of the one or more second glint reference points, wherein the slippage of the HMD represents a slipping of the HMD relative to eyes of a user of the HMD.

2. The method of claim 1, wherein the first set of the one or more first glint reference points is a single glint reference point which is an intersection of first and second diagonals, each of the first and second diagonals intersecting two opposing vertices of a first quadrilateral derived from four glints that were imaged during the calibration, and wherein the second set of the one or more second glint reference points is a single glint reference point which is an intersection of third and fourth diagonals, each of the third and fourth diagonals intersecting two opposing vertices of a second quadrilateral derived from four glints that were imaged during the monitoring.

3. The method of claim 2, wherein the monitoring detects the second quadrilateral and in response to detecting the second quadrilateral, the second set of the one or more second glint reference points are determined.

4. The method of claim 3, wherein the monitoring detects when the user of the head mounted display is looking straight ahead.

5. The method of claim 4, wherein the monitoring determines when to calculate the second set of the one or more second glint reference points.

6. The method of claim 2, wherein each of the first and the second quadrilaterals are detected through a method comprising:

fitting an ellipse to a detected pupil in an image and determining a center and size of the fitted ellipse;

rendering, in the image, a circle with a center at the ellipse's center, the circle having a radius that is at least twice the average of a major and a minor radius of the ellipse;

identifying contours defined by the glints in the image within the circle and determining if the number of contours is four;

obtaining coordinates of four glints to derive the four vertices of a quadrilateral.

7. The method of claim 6, wherein the intersection of the first and second diagonals is tested for one or more constraints before the method confirms the detection of the first quadrilateral.

8. The method of claim 1, wherein determining the first set of the one or more first glint reference points includes requesting a viewer using the HMD to look straight ahead and determining a quadrilateral having vertices defined by four glints that were imaged during the calibration.

9. The method of claim 8, wherein the glint system includes four infrared light sources that create the four glints and an image sensor that captures images of the four glints.

10. The method of claim 1, wherein the difference between the first set of the one or more first glint reference points and the second set of the one or more second glint reference points is compared to a threshold to determine whether to compensate for the slippage.

11. The method of claim 1, the method further comprising:

compensating for the detected slippage, the compensating based on an offset between the first set of one or more glint reference points and the second set of one or more glint reference points.

12. The method of claim 11, wherein the compensating is also based on a gaze mapping which uses as an input a vector from the second set of one or more glint reference points to a pupil center of an imaged pupil.

13. The method of claim 12, the method further comprising:

calibrating the gaze mapping, wherein the calibrating of the gaze mapping includes requesting a viewer to look at one or more objects on the display of the HMD and recording the position of a pupil center on an image sensor when the viewer looks at each of the one or more objects.

14. The method of claim 13, the method further comprising:

detecting a pupil center during the usage of the HMD;

determining a gaze of the viewer based on the detected pupil center.

15. The method of claim 14, wherein determining the gaze includes determining a vector from the second set of one or more glint reference points to the detected pupil center during the usage of the HMD.

16. A non-transitory machine readable medium storing executable program instructions which when executed by a data processing system cause the data processing system to perform the method of claim 1.

17. The head mounted display that performs the method of claim 1.

* * * * *